June 7, 1966  B. VER NOOY  3,254,909
SPLIT T AND METHOD OF MAKING THE SAME
Filed Sept. 10, 1963  3 Sheets-Sheet 3

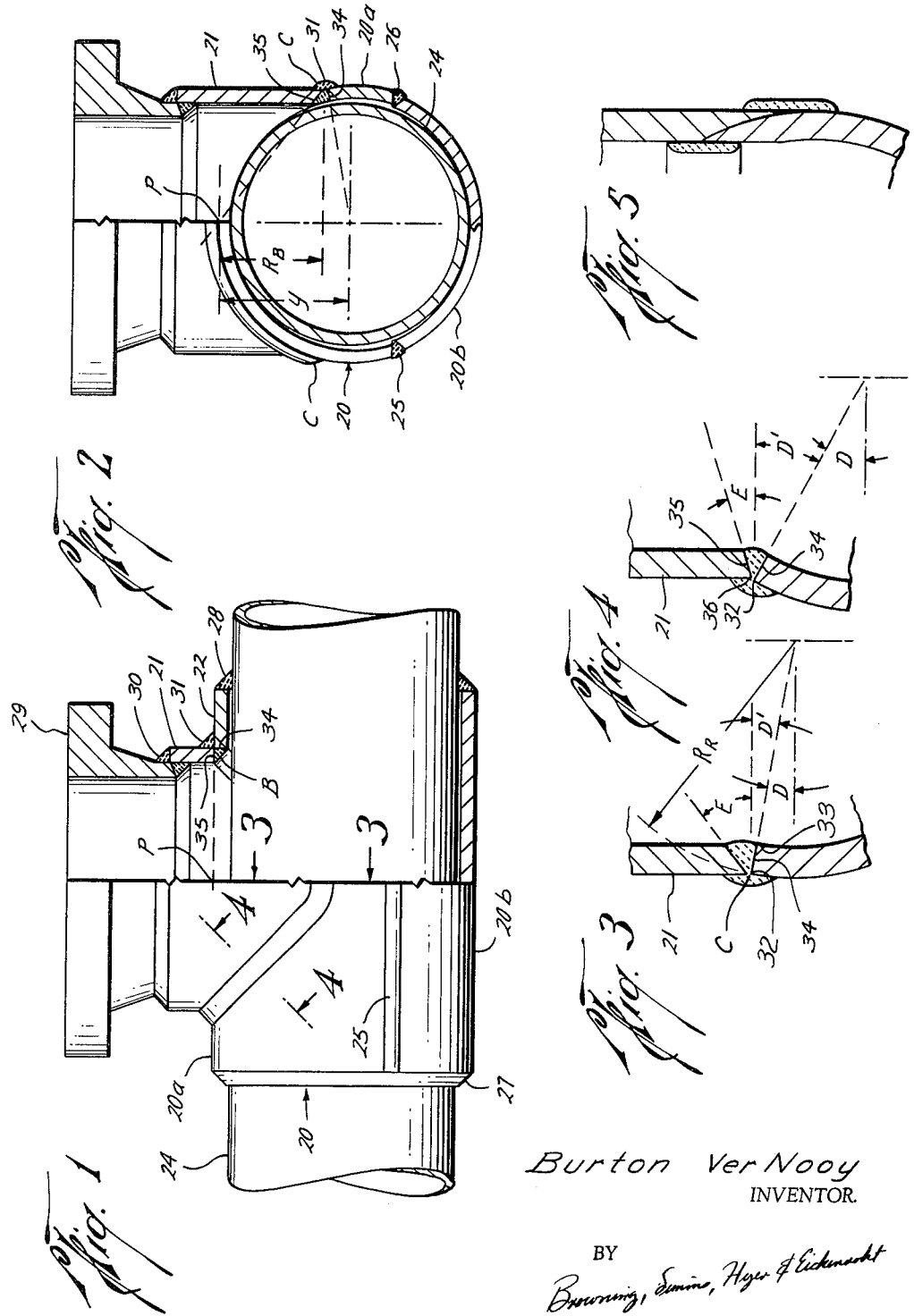

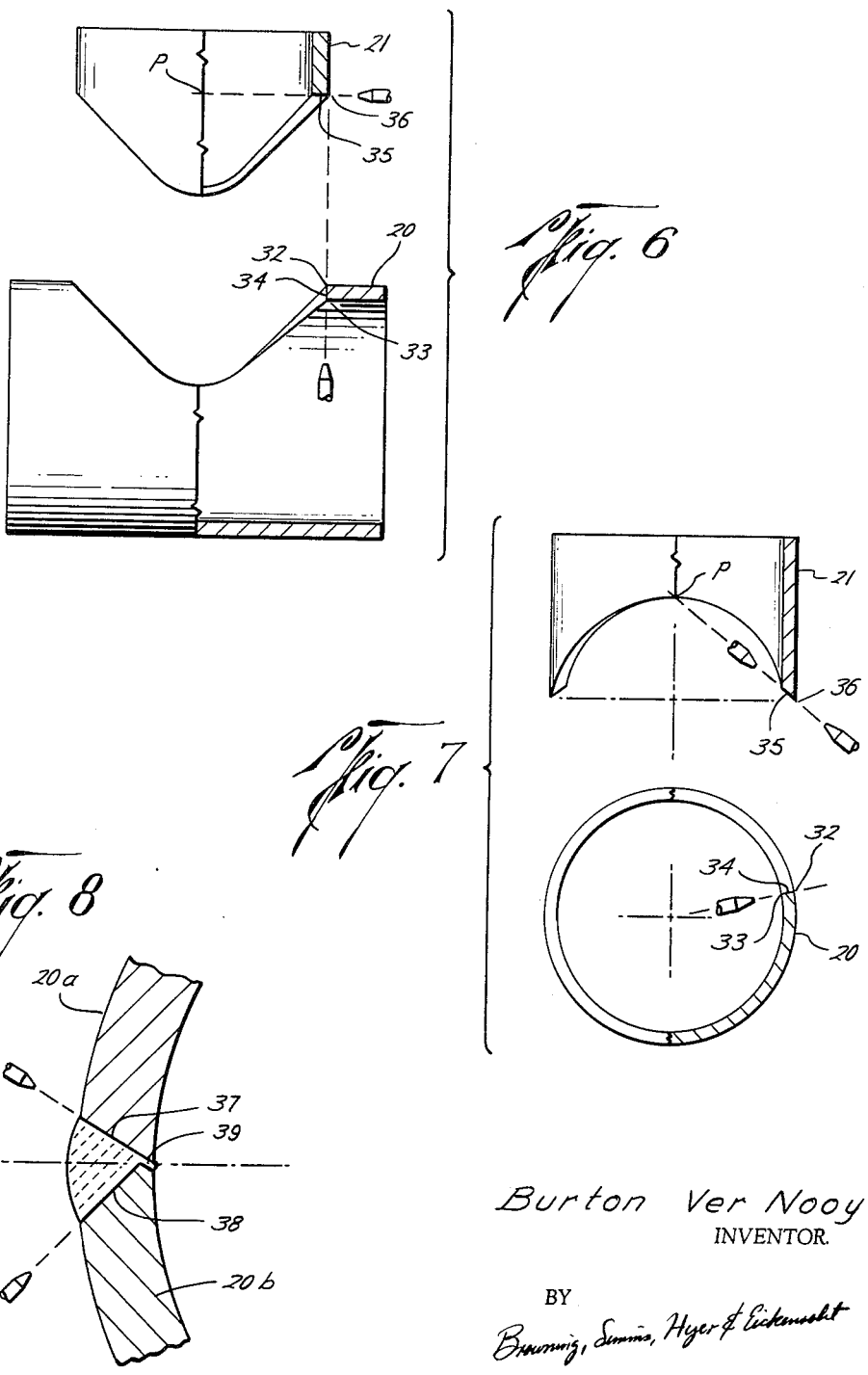

Burton Ver Nooy
INVENTOR.

BY
Browning, Simms, Hyer & Eickenroht
ATTORNEYS

United States Patent Office 3,254,909
Patented June 7, 1966

3,254,909
SPLIT T AND METHOD OF MAKING THE SAME
Burton Ver Nooy, Broken Arrow, Okla., assignor to
T. D. Williamson, Inc., Tulsa, Okla.
Filed Sept. 10, 1963, Ser. No. 308,010
4 Claims. (Cl. 285—189)

This invention relates to improvements in split T's of the type which are fabricated from tubular members and to a method of fabricating the same.

Split T's are useful in many applications, particularly in the "hot tapping" of pipelines. Pipelines are "hot tapped" when lateral openings are cut in the side of the pipeline while it is in service. This is usually done by attaching a split T to the pipeline, installing a valve on the T and mounting a hot tapping machine on the valve. The hot tapping machine is designed to extend a cutter through the valve to cut a coupon from the wall of the pipeline, after which the cutter carrying the coupon is returned through the valve, the valve closed, the hot tapping machine removed and the lateral connection completed.

Although preferred for several reasons, forged "split" T's are not always available, and it is frequently necessary to fabricate a T by welding two pieces of pipe together at right angles. For this purpose a hole is cut in the side of the pipe, which is to be connected about the pipeline to be tapped and is therefore known as the "run." The end of the other pipe to which the valve is to be connected, and which is therefore known as the "branch," is formed to encompass the hole in the run and engage the run completely around the hole.

Since this is a cutting torch operation, it is important that it be as simple as possible. The usual method of cutting a hole in the side of a pipe to form a run, is to hold the cutting torch parallel to the center line of the hole to be cut and move it along a circular path having a radius equal to the radius of the desired opening. The usual way of forming the end of the branch, to be attached over the hole in the run, is to hold the cutting torch on a line perpendicular to the center line of the branch and move it from one side to the other along an arc having a radius equal to the outside diameter of the run to which it is to be welded.

Although this is a simple, convenient, method of prefabricating the run and branch of a T, it results in a weak and, generally speaking, unsatisfactory welded connection between the two. The strongest welded connections result when weld metal is placed directly between the two members being welded, which cannot be done in this case since the end of the branch is in direct engagement with the outer surface of the run. In addition, the angle at which the lowermost edges of the branch are beveled produces a very thin wall section at these two points which further reduces the strength of the T.

It is an object of this invention to provide a run and branch which are simple and economical to manufacture, and which can be welded together to form a split T which has uniform strength throughout its welded joints.

This and other objects of the invention are obtained by a run having an opening cut in its wall in such a manner that the outer edge of the wall about the opening is spaced from the centerline of the opening a distance equal to the radius of the outside diameter of the branch and a branch having one end formed in such a manner that its outer edge can be positioned adjacent the outer edge of the wall about the opening in the run with the inner edge of the end surface of the branch and the inner edge of the wall about the opening through the run spaced apart such that the end surface of the branch and the wall about the opening in the run form an angle sufficient for the space between the two surfaces to be filled with weld metal. Thus a welded joint can be obtained which extends completely around the periphery of the opening in the run and the end of the branch wherein the stress imposed on one member is directly transmitted to the other along substantially the same path as it would travel if the two members were integrally connected. This is, of course, the strongest welded joint possible.

Preferably, the angle formed by the two surfaces being welded together should be that which is the best for the particular size of the members, e.g., for large members the angle need not be as great for a given size electrode as for small members. However, to fabricate the members to obtain a constant angle requires a complicated fixture which would unduly complicate the operation. Therefore, as will be explained below in connection with two embodiments of the invention, one of the members is usually formed with the cutting torch directed perpendicular to its outer surface whereas the other is formed with the cutting torch aimed at a predetermined reference line or point. This simplifies the fabricating operation and by properly selecting the reference line or point as the case may be, the angle between the surfaces can be maintained such that an excellent weld can be obtained even though the angle varies between a minimum and maximum amount throughout the joint.

Since, as explained above, the split T's of this invention have particular utility in "hot tapping" operations which require the run to be split into two sections which are welded together around the pipeline when the T is installed, it is an additional object of this invention to provide a method of cutting the pipe used for the run into two sections and preparing the edges of the two sections for welding by means of two rather than three cutting operations.

The invention will now be described in connection with the accompanying drawings in which:

FIG. 1 is a side view partly in elevation and partly in section of a T fabricated according to this invention; and installed on a pipe line with a flange connected to the branch.

FIG. 2 is an end view also partly in elevation and partly in section of the T of FIG. 1;

Figure 9:
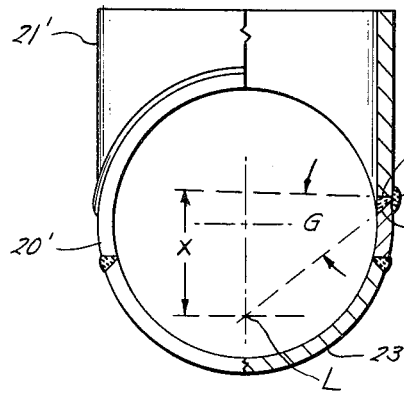
Figure 10:
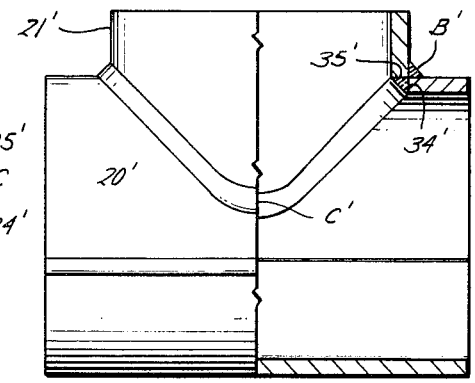
Figure 11:
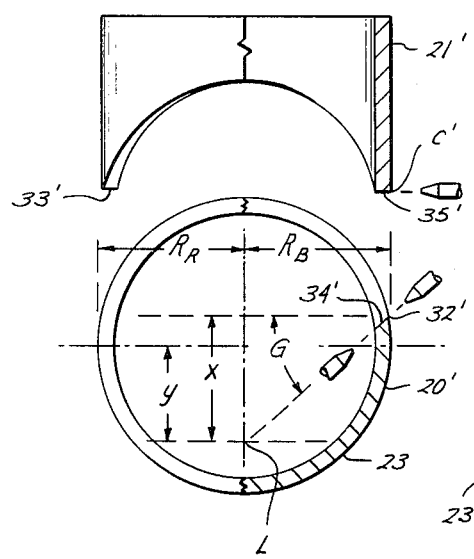
Figure 12:
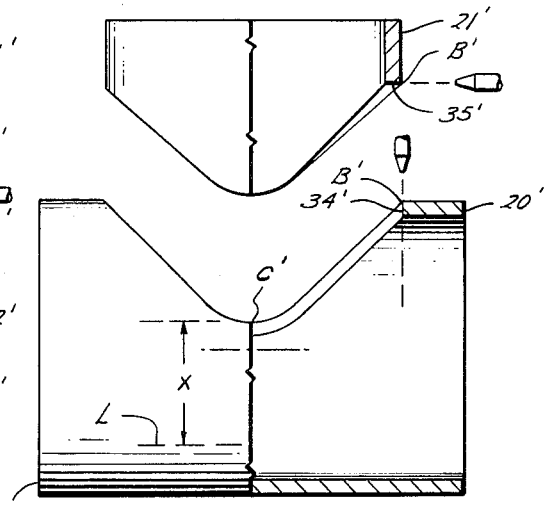

FIGS. 3 and 4 are enlarged views taken along lines 3—3 and 4—4 of FIG. 1 illustrating the configuration of the weld between the branch and the run of the T at different points alongs its length;

FIG. 5 is a sectional view of the type of welding connection obtained with the previous methods;

FIG. 6 and FIG. 7 illustrate one method of fabricating the run and branch of FIG. 1 to 4, wherein the torch is held perpendicular to the outer surface of the run while cutting the opening therein, whereas the torch is held so its line of cut passes through a fixed reference point in the centerline of the branch while forming it to obtain the desired angle between the surfaces being welded;

FIG. 8 illustrates the simplified method of splitting the run into two sections, whereby only two cutting operations are performed to split the run and prepare the edges for welding and the welded joint which results when the two sections are welded in place on the pipeline;

FIG. 9 is an end view, partly in elevation and partly in vertical section of an assembled T manufactured according to an alternate method of fabrication wherein the opening in the run is formed with the cutting torch perpendicular to and intersecting a fixed reference line which, in this case, is parallel to the longitudinal centerline of the run, whereas the branch is formed with the cutting torch directed perpendicular to its side wall;

FIG. 10 is a side view partly in elevation and partly in section of the T in FIG. 10; and FIG. 11 and FIG. 12 illustrate the method of prefabricating the run and branch of FIGS. 9 and 10 with the position of the members in each view being revolved 90°.

The T illustrated in FIGS. 1 and 2 consists of the "run" 20 and the "branch" 21 which is welded to the run. Since this is a spit T which is to be installed over pipeline 24 without cutting a section from the line, the run 20 must be split into two longitudinal sections 20a and 20b which can be placed in position around the pipeline and then reattached to each other by means of welds 25 and 26. The ends of the sections 20a and 20b are then welded about the pipeline itself by means of weld 27 and 28, and a flange 29 is attached to the outer end of the branch 21 for mounting the valve (not shown) which controls the flow of fluid from the pipeline after the pipeline has been tapped. Section 20a of the run, branch 21 and flange 29 are, of course, all assembled before installation on the pipeline as this allows an internal weld to be made where they are joined which would otherwise be impossible, unless the members were of unusually large diameter.

As illustrated in FIGS. 1 and 2, the T is in position on the pipeline 24 preparatory to the tapping operation, but before the coupon has been cut from its side. In practice, the aforementioned valve is attached to the flange 29 and a hot tapping machine (not shown) is mounted on top of the valve to permit a cutter to be passed through the valve and the branch 21 so as to cut and remove a coupon from the side of the pipeline 24. The valve could then be closed, the hot tapping machine removed and the lateral connection to the pipeline completed.

As stated above, to obtain the strongest possible welded joint between two members, weld metal must be placed directly between them, i.e., the weld metal must be positioned to more or less make a unitary structure of the two members being welded so that any stress imposed on the members can pass through the welded joint as if the weld were not present and the members were an integral, one piece structure. In the weld illustrated in FIG. 5, which is typical of prior practices, no weld metal is located directly between the two members and an extremely weak joint results. Any stress placed in one of these members would not travel directly to the other as it should, but rather along a circuitous path which reduces considerably the total amount of stress which the joint can take before failure. However, as shown in FIG. 1, in the welded joints 30 between the flange 29 and the end of the branch 21 and 31 between branch 21 and section 20a of the run 20, the transition from one member to the other is as direct as possible.

A vertical section taken at any point along weld 30 between flange 29 and branch 21 would appear as shown in FIG. 1, since the angle between the end surfaces of the two members is constant. The section shown through the weld 31 in FIG. 1 however, cannot be maintained completely around the joint due to the configuration of the two members. Thus, to obtain a welded joint 31 having approximately uniform strength, an opening is cut in the side of run 20 with the outside edge 32 of the wall about the opening spaced from the longitudinal axis of the opening a distance equal to the radius of the outside diameter of the branch. The cut is made with the cutting torch held perpendicular to the wall of the member so the inside edge 33 of the wall about the opening varies in its distance from the centerline of the longitudinal axis. Thus the effective opening through the member will actually be less than that of a hole having a diameter equal to the outside diameter of branch 21 because with the cutting torch held perpendicular to the surface of the run throughout the cutting operation, wall 34 of the opening varies from being vertical at the point "B" of FIG. 1, to being nearly horizontal at point "C" as shown in FIGS. 2 and 3. It would be horizontal at point "C" if the diameter of the hole equalled the outside diameter of the run.

The opening can be quickly and easily cut in run 22 by arranging the cutting torch, as shown in FIGS. 6 and 7, perpendicular to the outside surface of the run and rotating the run while simultaneously moving it longitudinally, causing the cutting torch to cut along the line formed by the intersection of the run and branch 21.

The branch 21 is prepared for welding by forming its end surface 35 so its outer edge 36 will be adjacent the outer edge 32 of the wall about the opening in run 20 by cutting along the line formed on its outside surface by the intersection of it and the run, while simultaneously maintaining the cutting line of the torch so that it always passes through the point "P." As shown in FIGS. 1 and 2, this point "P" is common to both the center line of the branch and a tangent to the uppermost point on the run. With end surface 35 of the branch and wall 34 about the opening in the run formed in this manner, the angle between them will vary from a maximum of 90° at point "B" as shown in FIG. 1 to some minimum angle at point "C" determined by the outside diameter of branch 21. The angle at this point, as shown in FIGS. 3 and 4, is the sum of the angles E and D' (which is equal to angle D), and is a minimum when the outside diameter of the branch equals the outside diameter of the run, which reduces the angle D' to zero. When angle D' is zero, angle E will always equal 45° so the minimum angle between the two surfaces at C can be no less than 45°. Between points B and C, the angle between surfaces 34 and 35 increases gradually, angle D' increasing faster than angle E decreases until a maximum of 90° is reached at point B.

This arrangement allows the two surfaces 33 and 34 to be completely interconnected with weld metal around their entire periphery, thereby producing a connection between the two of approximately uniform strength. This arrangement is particularly advantageous at point C where, as discussed above, the wall section of the branch would taper to a feather edge when the branch was formed by the previously used method and would not not only be relatively weak but also difficult to weld.

The angle produced between surfaces 34 and 35 depend on the location of point "P." Generally, it should be on the longitudinal axis of the branch. However, where it is located on the axis will depend on the relative size of the branch and the run. For example, if the run is large relative to the branch, point "P" could possibly be moved downward since angle D' may be large enough itself to provide sufficient room for an electrode. Conversely, if the members are small, it may desirable to move point "P" upward to increase the angle between the surfaces.

Also the reference "point" can be a line as is the case in the alternate embodiment of the invention shown in FIGS. 9–12.

Here, branch 21' is cut preparatory to welding by contouring its end with the cutting torch held perpendicular to the outside wall of the branch, which is similar to the way run 20 was prepared above. This produces a surface 35' which is horizontal at all points. To obtain the desired angle between surface 35' and the wall 34' at point C', the opening in the run 20' is cut with the cutting line of the cutting torch perpendicular to and passing through a reference line "L" which intersects the longitudinal axis of the branch and is parallel to the longitudinal axis of the run, but displaced a distance "Y" below the longitudinal axis of the run.

The reference line is also located a distance "X" below the lowermost point on the run of the outer edge 32' of the opening. Thus when $X=R_B$, the angle "G" equals 45° at point C', which is where it is a minimum. The angle at B' will remain at least 90° at all times as was the case in the embodiment described above. Reference line "L" can, of course, be moved up or down as desired depending upon the size of the members to obtain the desired minimum and maximum angles.

The embodiment shown in FIGS. 9–12 may be easier to assemble since it is probably easier to make the weld at C' in FIG. 9 than to make the weld at C in FIG. 3, particularly if the diameter of the branch is unusually small in comparison to that of the run.

Heretofore run 20 has been split into two sections 20a and 20b by cutting along the desired line with the cutting torch directed perpendicularly toward the wall and then beveling each edge 37 and 38 (FIG. 8) at about 45° to provide approximately a 90° joint for welding. This was done also to provide a short unbeveled land adjacent the inner edges of the two members to help keep the weld metal from spilling over to the inside of the two members. One step in this process can be eliminated by making the original slitting cut at the desired bevel angle, preferably 45°, to form surface 37 as shown in FIG. 8. Then by beveling surface 38 in the conventional manner, i.e., at an angle of 45° to a tangent to the outside surface of the member, land 39 is produced, which has the same angle as surface 37. The fact that land 39 is at an angle has been found to improve its function since it offers a less direct route for the weld metal to follow to reach the inside surface of the two members.

From the foregoing, it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof; it is to be understood that all matter herein set forth or shown in the accompanying drawings is to be interpreted as illustrative and not in a limiting sense.

The invention having been described, what is claimed is:

1. A split T comprising a run having an opening in its side wall and a branch having an outside diameter equal to the diameter of the opening at the outer edge of the wall forming the opening, said branch having an end formed to be positioned over the opening with the outer edge of the end wall of the end substantially adjacent the outer edge of the wall about the opening in the run; the wall about the opening in the run being perpendicular to the outside surface of the run and the end wall of the branch being tangent to a line extending through a point lying on the centerline of the branch and spaced above the longitudinal axis of the run a distance at least as great as the radius of the branch to provide wall surfaces which diverge inwardly from their adjacent outer edges at at least 45° to form a cavity, and weld metal applied within said cavity and also to the adjacent outside surfaces of the branch and run to directly connect said branch and run together.

2. A split T comprising a run and a branch positioned with their longitudinal axis at right angles to each other, said branch having an end wall adjacent the run that is perpendicular to the longitudinal axis of the branch, said run having an opening in its side wall with a diameter at the outside edge of the wall around the opening equal to the outside diameter of the branch, the opening being so formed that any line that intersects the outside surface of the run at the maximum diameter of the opening and that intersects and is perpendicular to a reference line, is tangent to the wall, said reference line being positioned parallel to the longitudinal axis of the run to intersect the longitudinal axis of the branch at a point located on the opposite side of the branch from a plane which is parallel to the longitudinal axis of the run and that intersects the two points on the outer edge of the wall of the opening closest to the longitudinal axis of the run, said line being spaced from the plane a distance at least as great as one-half the outside diameter of the branch to provide a wall around the hole that diverges from the end wall of the branch at an angle of at least 45°, and weld metal applied between the end wall of the branch and the entire wall of the opening and also between the adjacent outside surfaces of the branch and run to directly connect the branch and run together.

3. In a method of fabricating a split T from tubular goods for welding to a pipeline for "hot tapping" the pipeline, the T having a run comprising at least one curved section capable of being welded around the pipeline, with the curved section having a lateral opening through its wall, and a tubular branch welded over the opening in the curved run section; comprising: providing a tubular member composed of at least one curved section capable of encompassing a portion of the pipeline; cutting an opening in the wall of said curved section with the diameter of the opening at the point where the opening intersects the outside wall of the curved section equal to the outside diameter of the branch and with the line of cut perpendicular to the surface of the curved section at all times during the cutting operation; forming the end of the tubular branch to engage the surface of the curved section completely around the periphery of the opening in its wall and with its end wall tangent to a line which passes through a point on the center line of the branch said point being spaced above the longitudinal axis of the run a distance at least as great as the radius of the branch; and welding the tubular branch member to the curved section by depositing weld metal between the end wall of the branch member and the entire wall between the inside and outside edges of the opening and also depositing weld metal between the adjacent outside surfaces of the branch member and the curved section.

4. A method of fabricating a split T from tubular goods for installation on a pipeline preparatory to "hot tapping" the pipeline, comprising providing a tubular member composed of at least one curved section capable of encompassing a portion of the pipeline; cutting an opening in the wall of the curved section with the cutting line perpendicular to and passing through a reference line which intersects the center line of the opening and which is parallel to but offset below the longitudinal center line of the section a distance not greater than the radius of the tubular member but sufficient to cause the cutting line to form a minimum angle of about 45° with a plane extending through the reference line perpendicular to the center line of the opening; forming the end of a tubular branch member, having an outside diameter equal to the diameter of the opening at the outer edge of the wall about the opening cut in the curved section, for its end wall to be perpendcular to the longitudinal axis of the member and for the outer edge of the end wall of the branch to lie closely adjacent to the outer edge of the wall around the opening; positioning the tubular branch member with the outside edge of its end wall adjacent the outside edge of the wall about the opening in the curved section; and welding the branch to the curved section by depositing weld metal between the end wall of the branch and the entire wall between the inside and outside edges of the opening and also depositing weld metal between the adjacent outside surfaces of the branch and the curved section.

(References on following page)

References Cited by the Examiner

UNITED STATES PATENTS

| | | | |
|---|---|---|---|
| 1,302,412 | 4/1919 | Murray | 138—99 |
| 1,457,183 | 5/1923 | Mitchell | 285—286 X |
| 1,467,792 | 10/1921 | Holmes | 29—482 |
| 1,787,580 | 1/1931 | Jasper | 285—286 X |
| 1,966,403 | 7/1934 | Durham | 285—286 X |
| 1,991,429 | 2/1935 | Straty | 285—286 X |
| 2,015,246 | 9/1935 | Taylor | 285—286 X |
| 2,916,308 | 12/1959 | Voldrich et al. | 285—286 X |

FOREIGN PATENTS 620,987   4/1949   Great Britain.

OTHER REFERENCES

Linde Co., The Oxy-Acetylene Handbook, 1961 (pp. 429, and 450–54).

H.P.C.N.A. Standard Manual of Pipe Welding, 1931 (pp. 136–142 and 165).

Fuchs: Welding Practice, vol. II, 1952 (p. 153).

The Petroleum Engineer, December 1940 (p. 72).

The Linde Air Products Co., Fabrication of Welded Piping Designs, 1930 (page 70).

CARL W. TOMLIN, *Primary Examiner.*

T. A. LISLE, *Assistant Examiner.*